United States Patent
Condon et al.

(10) Patent No.: US 7,686,481 B1
(45) Date of Patent: Mar. 30, 2010

(54) ILLUMINATION APPARATUS, METHOD, AND SYSTEM FOR CONVERTING PSEUDO-COLLIMATED RADIANT ENERGY INTO A PREDETERMINED PATTERN IN ANGLE SPACE WITH CONTROLLED INTENSITY

(75) Inventors: Patrick J. Condon, Morris, IL (US); Mark B. Pruss, Coal City, IL (US)

(73) Assignee: Innovative Lighting, Inc., Roland, IA (US)

( * ) Notice: Subject to any disclaimer, the term of this patent is extended or adjusted under 35 U.S.C. 154(b) by 112 days.

(21) Appl. No.: 11/082,516

(22) Filed: Mar. 17, 2005

(51) Int. Cl.
*F21V 5/00* (2006.01)
(52) U.S. Cl. .................. 362/331; 362/333; 362/339; 362/521; 362/522; 362/800
(58) Field of Classification Search .............. 362/294, 362/331, 333, 339, 520–522, 800
See application file for complete search history.

(56) References Cited

U.S. PATENT DOCUMENTS

| | | | | |
|---|---|---|---|---|
| 2,551,954 A | * | 5/1951 | Lehman ...................... | 362/333 |
| 4,652,979 A | * | 3/1987 | Arima ........................ | 362/522 |
| 5,040,104 A | * | 8/1991 | Huisingh et al. ............. | 362/333 |
| 6,547,423 B2 | * | 4/2003 | Marshall et al. ............. | 362/333 |
| 6,955,453 B2 | * | 10/2005 | Kunimochi et al. ......... | 362/333 |

\* cited by examiner

*Primary Examiner*—Stephen F Husar
(74) *Attorney, Agent, or Firm*—McKee, Voorhees & Sease, P.L.C.

(57) ABSTRACT

A radiant energy redirecting apparatus, method, and system. In one aspect, it comprises two radiant energy distribution surfaces, each surface comprised of a multiplicity of equivalently shaped linear distribution elements, where each surface acts to distribute radiant energy in orthogonal directions, and where each surface is comprised of refractive or total internal reflection elements, or a combination thereof, for the purpose of efficiently directing pseudo-collimated radiant energy into a generally rectangular-shaped output distribution in angle space.

94 Claims, 12 Drawing Sheets

ILLUMINATION APPARATUS, METHOD, AND SYSTEM FOR CONVERTING PSEUDO-COLLIMATED RADIANT ENERGY INTO A PREDETERMINED PATTERN IN ANGLE SPACE WITH CONTROLLED INTENSITY

I. BACKGROUND OF THE INVENTION

A. Field of the Invention

The invention relates to an efficient method for the redistribution of radiant, particularly electromagnetic, energy for illumination purposes. More particularly, it is a practical method for the efficient distribution of pseudo-collimated light energy into a pre-determined image pattern with controlled intensity in the pattern.

B. Problems in the Art

Numerous situations require or benefit from the controlled distribution of radiant energy. Many times the source of radiant energy is omni- or non-directional. Many advantageous functions are possible by controlling its direction, distribution, and intensity.

For the purposes of this disclosure, the terms light, radiant energy and electromagnetic energy may include portions of the electromagnetic spectrum in the visible region and may also include portions of the electromagnetic spectrum which lie outside the visible range (e.g. infrared and ultraviolet).

There are two branches of optical design with regard to the distribution of electromagnetic radiation—imaging and non-imaging. Imaging optics can be defined as the science of transferring electromagnetic energy from an object plane to an image plane with minimal distortion. For the purposes of discussion, one can define the "object plane" or "input image" as a predefined energy input distribution, while the "image plane", "image" or "output image" can be defined as a pre-defined energy output distribution which may vary in both intensity and direction. Typically, imaging optical systems significantly attenuate the input image energy in the process of minimizing the output image's distortion. The degree to which the imaging optical system attenuates the energy transfer depends upon the application. The energy attenuation of imaging optical systems is acceptable for applications such as cameras, microscopes, and the like. However, when the application is an illumination system, the primary goal is to maximize the energy throughput of the optical system. Hence, the other branch of optical design, non-imaging optics, is the science of maximizing the transfer of electromagnetic energy from a source image to an output image. Thus, non-imaging optics are particularly useful for illumination applications.

There are many situations where electromagnetic energy is required to be distributed into a pre-determined output image with a maximum transfer of source energy. For example, overland vehicle safety lighting, aircraft lighting, street lamp lighting, and marine lighting require specific output patterns, many times determined by government regulations which can have minimum and maximum illumination values and which vary substantially in different directions. In each such case, regulations typically specify minimal photometric requirements that must be met by the illumination device. In many of the above cases the required output distribution is rectangular in angle space and these applications are one aspect of what the present invention addresses.

It is difficult to achieve required output distribution efficiently and economically with imaging systems. Historically, in non-imaging solutions, designers used simplified surface geometry to approximate output images. However, this tends to result in non-optimal solutions which necessitate greater source energy and higher system power requirements. Output surfaces in typical collimated light solutions are comprised of a few simple shapes including ellipses, parabolas, radii, toroidal sections, and multi-radii surfaces. However, these surfaces limit the available distributions to meet a specific requirement. The result is that some areas of the pattern receive too much energy in order to meet required specifications, requiring a greater source energy and greater power consumption to meet requirements. Thus, it is also difficult to meet many required output distributions with non-imaging systems with efficacy and efficiency. With simplified optics such as used in conventional non-imaging illumination systems, it is also difficult to get precise control of light, particularly to distributed points throughout a required pattern.

An example illustrates the problems and deficiencies in the art. With respect to reverse or back-up illumination lights for semi-tractor trailers, regulations tend to require a minimum amount of light intensity within a rectangular pattern, measured within the light output of the reverse light. Not only are there minimums for light levels generally, but also minimums for specific regions or points throughout the rectangular pattern. In other words, it is not enough that a certain light level is met somewhere in the rectangle. There must be certain minimum light levels achieved at a variety of points or areas within the rectangle.

It is conventional to have a standard incandescent light bulb as the light source for reverse lights. It emits substantially omni-directional or a spherical ball light. Conventional semi-tractor trailer back up lights have a simple, circular shape. A housing and a simple, single, circular lens typically are the components that direct the light. This throws out essentially a big, rough circular beam or pattern of light. The intensity distribution of such a circular output pattern lamp can only be controlled relative to one axis and it does not match up well with a rectangular pattern requirement.

The most common technique used by optical designers to attempt to meet rectangular pattern requirements with a circular output pattern is by projecting a large circular pattern which covers the rectangle. However, this sends substantial light outside the rectangular pattern. This is inefficient. Light is wasted. For example, the number of lumens of light energy in a large circular pattern that subsumes the required rectangular pattern would be significantly higher than an efficient rectangular distribution that is basically limited to the required rectangular pattern. To ensure sufficient light intensity requirements are met throughout the rectangular pattern, the conventional inclination is to use higher intensity or larger light output light sources. This adds cost and adds to energy consumption. It can actually result in the inefficient generation of substantially too much light at all or most of the points in the pattern, just to ensure minimum requirements at all the points are met.

Thus, there is room for improvement in the art regarding a more efficient way to meet light requirements from a circular reverse light generating a circular light pattern to meet rectangular lighting requirements. In the case of semi-tractor trailer reverse lights, it is critical for safety that the driver have sufficient practical illumination of what is behind the trailer when backing. What is "sufficient practical illumination" balances amount of light with cost of light. High intensity flood lights could provide more than enough illumination. But, of course, energy usage and limited life of such lights are disadvantages. And an over-the-road vehicle does not have the luxury of unlimited electrical power. Size and placement on a tractor trailer also are limitations. Large bulky flood lights would be impractical. Robustness is also important. Fragile flood lights would not be practical. Also, there are practical limitations on how much light, and it what pattern, back lights can produce. Glare from high intensity flood lights would be impractical and unsafe on an over-the-road vehicle. Thus, an improvement must take into consideration economics and must overcome limitations regarding size, weight, and characteristics of the light.

Another design technique used in the past is to use a lens to modify the output pattern of the light. Such designs create a lens surface profile in one direction and sweep it through a profile in the second direction forming what is known in the art as a "pillow" lens. The result of this sweeping is that both the horizontal and vertical distribution can be controlled. However, these pillow-type lenses can only diffuse light to approximately 30 degrees. Examples of angular requirements for automotive lighting include the following: (a) stop, tail and turn lamps are generally −80 to +80 degrees horizontal, (b) reverse lamps are generally −45 to +45 degrees horizontal and (c) clearance, side marker and identification lamps are generally −45 to +45 degrees horizontal. As can be seen, these requirements substantially exceed the 30 degree capability of typical pillow type lenses. Therefore, they are not practical for many automotive illumination or lighting applications.

Historically, the preferred energy source for these lights was an incandescent lamp. Recent advances in technology have allowed light emitting diodes (LEDs) to be employed as the source energy. LEDs have many advantages over incandescent sources including longer life, faster turn on times, and low energy consumption. The main disadvantage of LED sources is the cost, which can be ten times that of an incandescent lamp.

It was due to the low cost of incandescent lamps that the practice of using simplified surface geometry for controlling light from these devices has been acceptable for decades. With the advent of LEDs, and the cost associated with these improved sources, the use of simplified optical geometries can be cost prohibitive. Using more complex optics with incandescent sources, or with LEDs, adds further to the cost. There is a real need in the art for a more cost-effective reverse light of this type.

The foregoing example of tractor-trailer reverse lights is illustrative of similar issues with other automotive lights. And similar issues exist with respect to other illumination applications, and other types of radiant energy, and for different output patterns or light distribution within required output patterns. The control of radiant energy from a source into a different output pattern in an efficient, effective, economical way is a need for many applications. This includes more efficient use of electrical power in their operation. Therefore, there is a need in the art for improvement regarding these types of issues and illumination applications.

II. SUMMARY OF THE INVENTION

It is therefore a principle object, feature, advantage, or aspect of the present invention to present an apparatus, method, and system for efficient conversion of radiant energy into a predetermined distribution pattern in angle space with controlled intensity which improves over or solves problems and deficiencies in the art.

Further objects, features, advantages, or aspects of the invention include an apparatus, method, or system as above-described which:

(a) provides a relatively high level of control of direction and intensity of the energy.

(b) is relatively economical to make, use and maintain.

(c) is effective to efficiently distribute energy.

(d) is effective in the efficient use of electrical power.

(e) promotes longer source life.

(f) promotes shock and vibration resistance.

(g) allows flexibility in design relative to application and output pattern.

(h) allows flexibility in control and shaping of the energy in an economical, efficient manner, including distribution of light within a desired pattern.

(i) allows control of energy, even in relatively limited size and space for the device.

One aspect of the invention provides an improved non-imaging optical distribution apparatus that provides a means for shaping a pseudo-collimated beam into an accurately represented predetermined rectangular output distribution.

Another aspect of the invention provides an improved light distribution device comprised of two separate, orthogonally-oriented beam shaping surfaces, each surface controlling the output intensity distribution on a separate axis, for the purpose of generating rectangular output distributions.

Another aspect of the invention provides a means for efficiently directing light energy from a pseudo-collimated source into a required rectangular output pattern with angles greater than 30 degrees from the optical axis. This is accomplished by separating the horizontal and vertical profiles of a standard pillow lens into separate lens surfaces where an accurately shaped profile can be generated which provides a combination of a refractive and internally reflective surface for spreading light into the required pattern. The surfaces are designed such that collimated light inside the lens material impinges on the distribution surface. A total internal reflection portion of the surface is designed at an angle greater than the critical angle for the light causing the internal reflection of the collimated beam toward portions of the pattern requirement. The separation of the horizontal and vertical distribution components of these pillow lenses into separate surfaces allows the use of total internal reflection to meet the higher angle requirement present in many exterior automotive specifications.

Another aspect of the invention provides a means for minimizing source energy required in order to meet regulated SAE/DOT exterior light patterns.

Another aspect of the invention provides a means for manufacturing an improved reverse light with a single 1 Watt 23 Lumen white LED as the source.

Another aspect of the invention relates to two orthogonally opposed energy distribution surfaces whereas each surface is comprised of a multitude of identical linearly extruded cross-sections for the purpose of spreading pseudo-collimated radiant energy or light in predetermined proportion into a substantially rectangular output distribution. The linearly extruded cross-sections are designed for each surface to distribute the correct proportion of light to each angular region of the required pattern. A cross-section through the output distribution pattern at different points reveals that the same intensity proportion exists throughout the pattern in either of the lens surface extrusion directions (i.e. parallel to or perpendicular to the lens elements). This additional flexibility in radiant energy pattern distribution allows a near perfect match to certain requirements to be made, resulting in a high efficiency solution to the problem. In a typical application of this aspect of the invention, radiant energy in the form of light from a real world source such as an LED or incandescent lamp is collected and substantially collimated into a beam. The collimated beam will typically be comprised of a pseudo-collimated waveform with between 0 and 10 degrees between the peak intensity and the half intensity point. The waveform is typically generally Gaussian in its angular distribution, however, a wide variety of beam profiles are possible with the sole requirement that the beam be substantially collimated.

In one exemplary form of a reverse light according to the invention, light from a source such as an LED is collected and collimated into as tight of a beam as possible by a collimating surface or collimating lens surface formed on one side of a light transmissive member. The beam inside the light transmissive member's material impinges on a first distribution surface (or another lens surface) formed on the member's opposite side, which is comprised of both refractive and total internal reflection segments that work in combination to generate a wide output distribution with the appropriate intensity ratios for the pattern. Light exiting the first distribution surface impinges on a second distribution surface (a still further lens surface) formed on the surface of another light transmissive member and is spread in a direction orthogonal to the first pattern resulting in a rectangular output distribution with near ideal intensity ratios. This three lens surface arrangement thus manipulates light from a non-collimated light source into a collimated beam by a collimating lens surface, then spread in one direction by the first distribution surface, then spread in a second direction by the second distribution surface. The three surfaces can be formed each in a separate member or combined in different combinations in fewer members.

These and other objects, features, advantages, and aspects of the present invention will become more apparent with reference to the accompanying specification and claims.

III. BRIEF DESCRIPTION OF THE DRAWINGS

The subject matter, which is regarded as the invention, is particularly pointed out and distinctly claimed in the concluding portion of this specification. The invention, together with further objects, features, aspects, and advantages thereof, may best be understood by reference to the following description taken in connection with the accompanying drawings.

FIG. 1 is an exploded view of a reverse light assembly according to one exemplary embodiment of one aspect of the present invention, showing crossed or orthogonal lens elements (a lens element or second light distribution surface on the circular outer cover member, a lens element or first light distribution surface on the disk-shaped middle member), a light source (and a plate-shaped heat sink on which the light source is mounted), and a cylindrical assembly body or base in which the light source and heat sink are operatively mounted, and to which the outer cover and middle member are mounted. In this embodiment, the middle member also has a collimator lens on one of its surfaces.

FIG. 2 is an isolated, enlarged, assembled sectional view of just the middle member and the outer cover member. The section is taken along line 2-2 of FIG. 1. It shows a cross-section of the collimator surface and first distribution surface for the reverse light assembly of FIG. 1. The middle member combination of surfaces collects the LED light into a highly collimated beam and spreads the light into an approximately +/−45 degree pattern. The outer cover spreads light in a limited range along an axis orthogonal to the +/−45 pattern.

Figure 6:
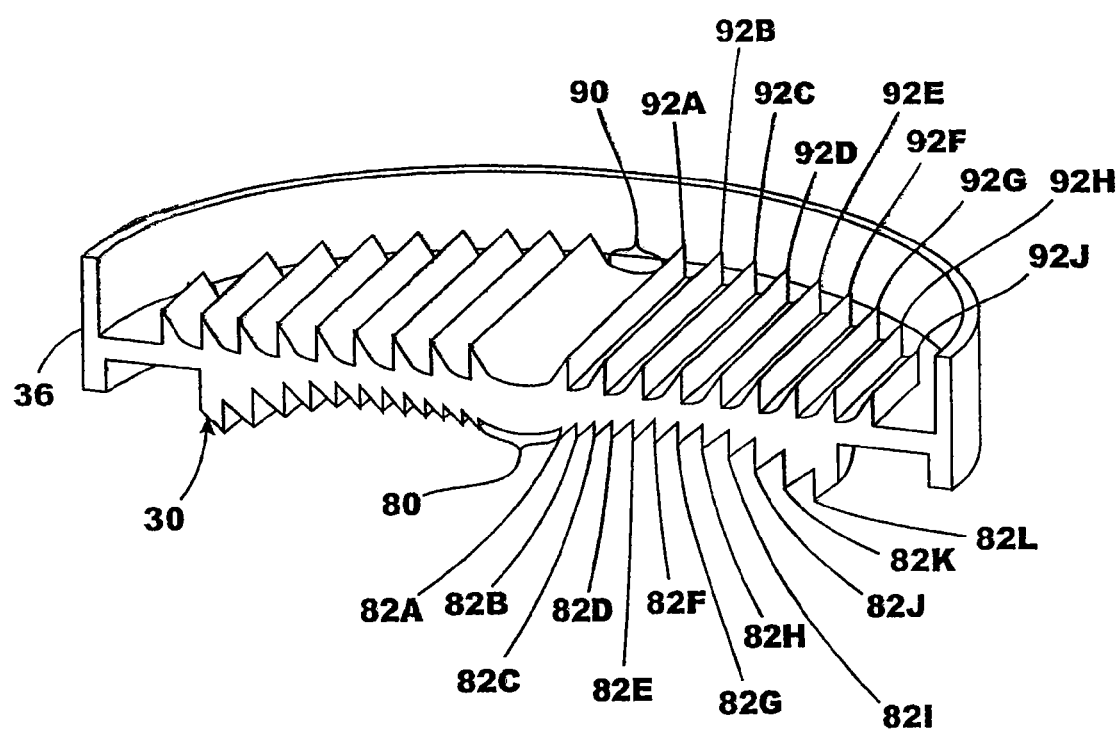
FIG. 6 is an enlarged, sectional, perspective view of just the middle member of FIG. 5 (the same general section as in FIG. 2) showing the first distribution surface on the opposite side of the member from the collimating surface of FIG. 5.
Figure 7A:
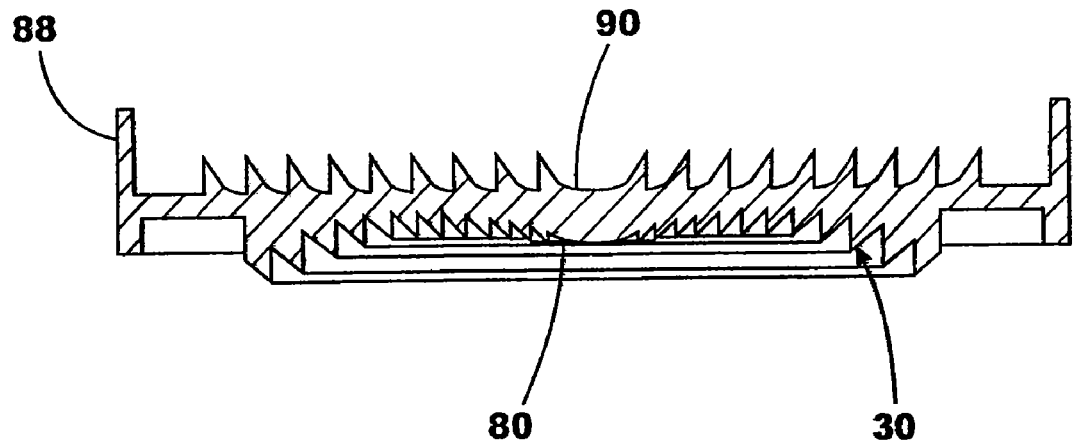
FIG. 7A is a front elevation view of FIG. 6.
Figure 7B:
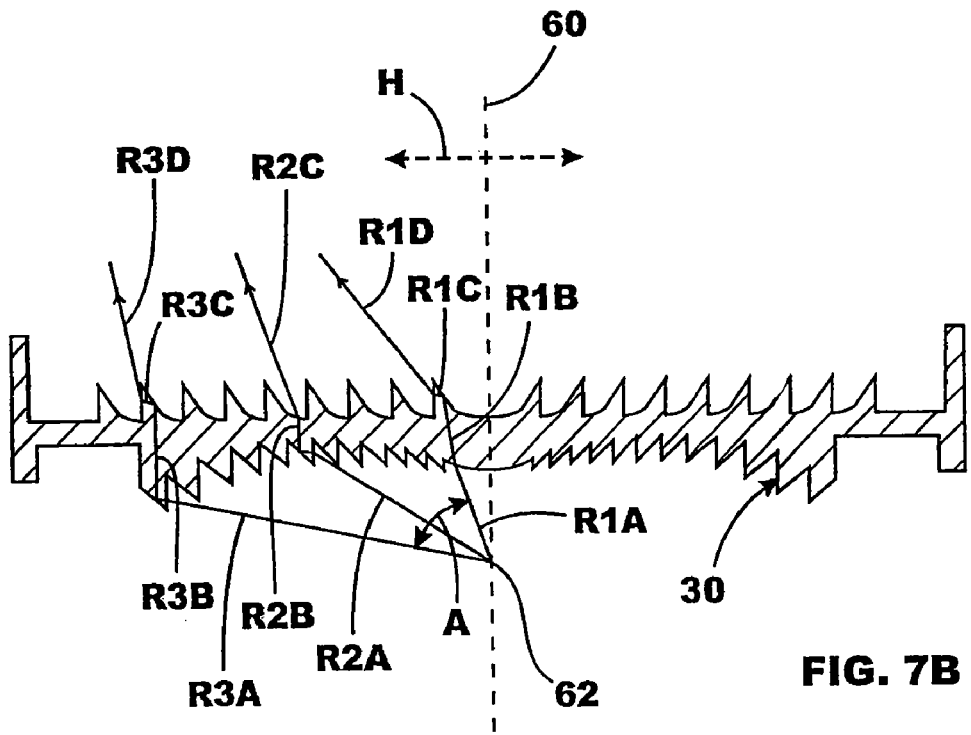
FIG. 7B is similar to FIG. 7A but diagrammatically illustrates three light rays passing from the source through the various surfaces of the middle member or component of the assembly. As can be seen, the light from the source is collimated inside the material of this member and distributed by the exit surface of the member.
Figure 8A:
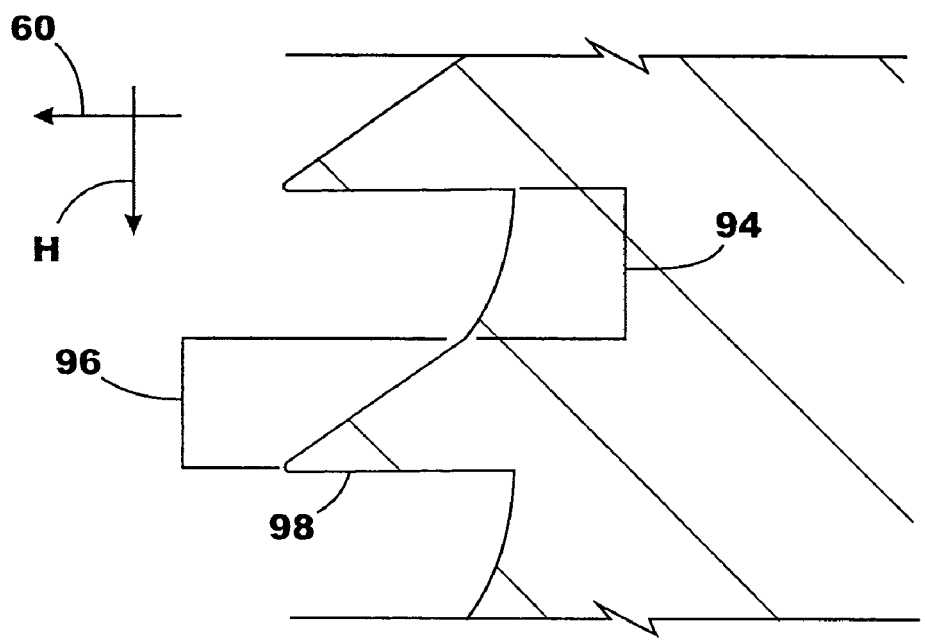

FIG. 8A is a further enlarged, close up view of a portion of the exit surface of the middle member of FIGS. 6, 7A, and 7B, also referred to as the first distribution surface, for the reverse light assembly. This surface distributes the light into the −45 to +45 degree horizontal distribution required to meet specifications. The view highlights and distinguishes between refractive and reflective/refractive portions of the lens surface.

Figure 8B:
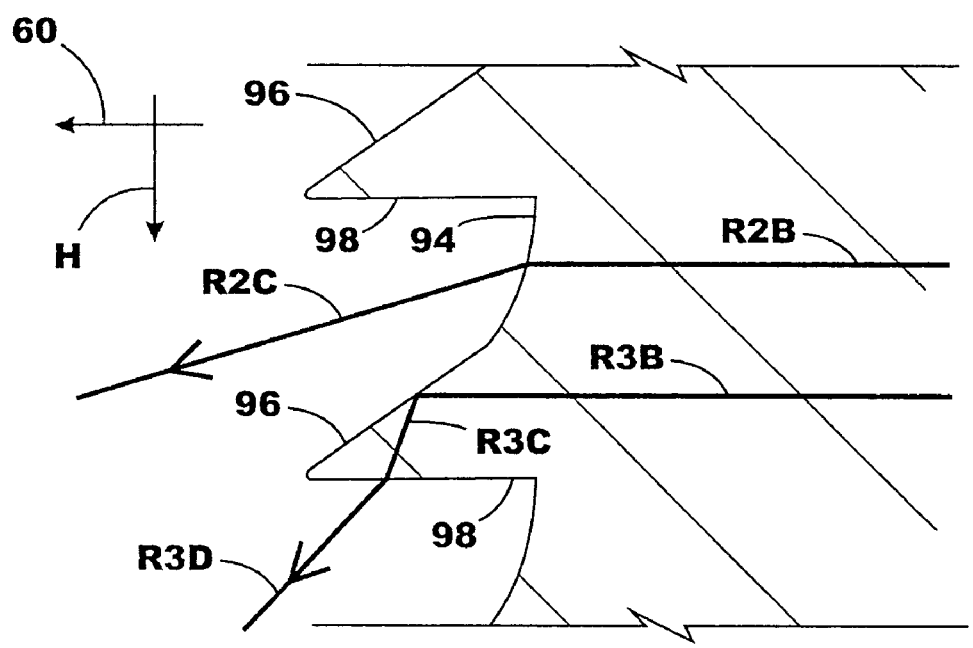

FIG. 8B is similar to FIG. 8A but also contains an example of a first ray refracted by the refractive portion identified in FIG. 8A, and a second ray which is first reflected then refracted by the reflective/refractive portion of the optic as identified in FIG. 8A.

Figure 1:
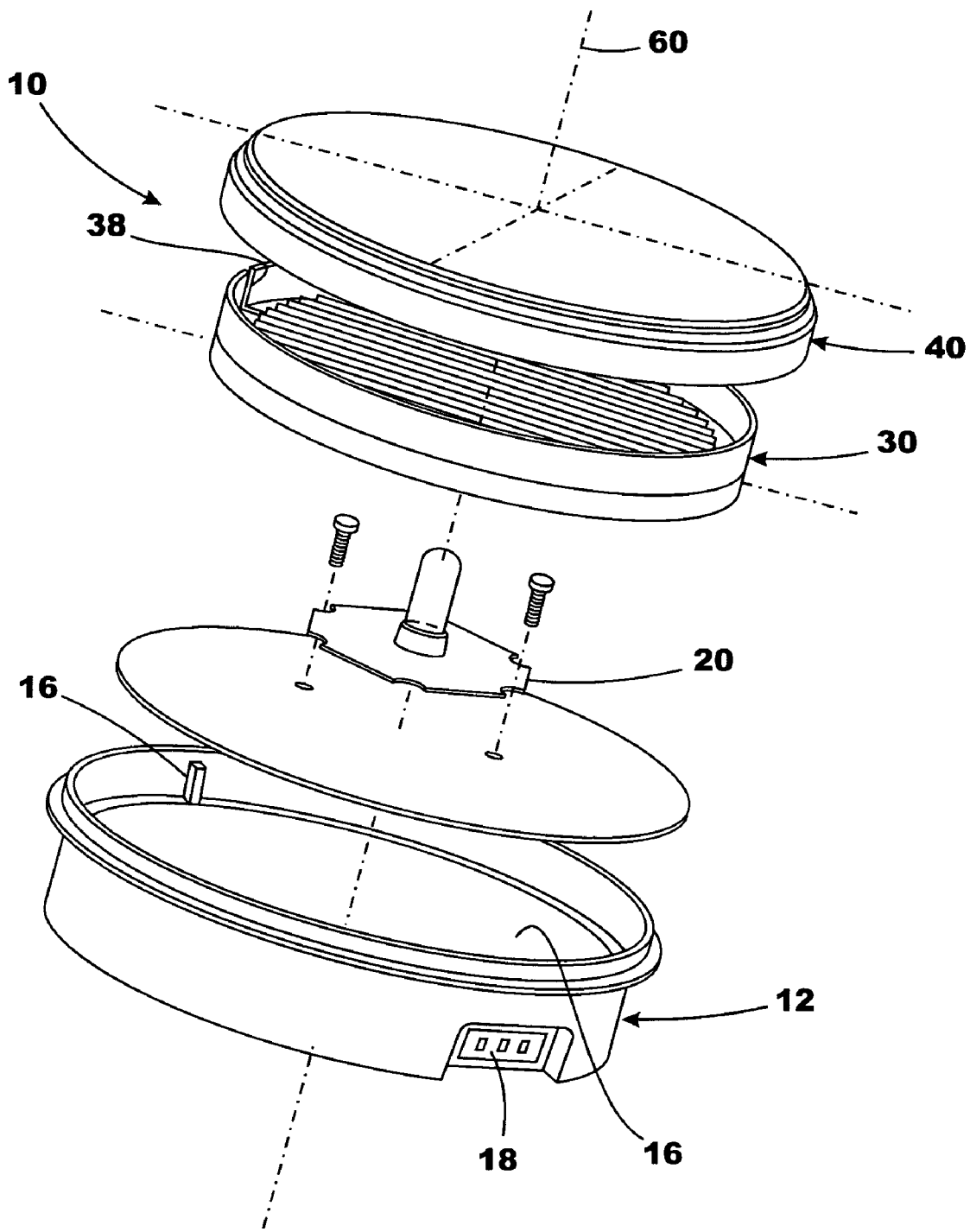

FIG. 9A is an enlarged perspective view of the inner surface of the outer lens member of the reverse lamp assembly of FIG. 1.

Figure 9:
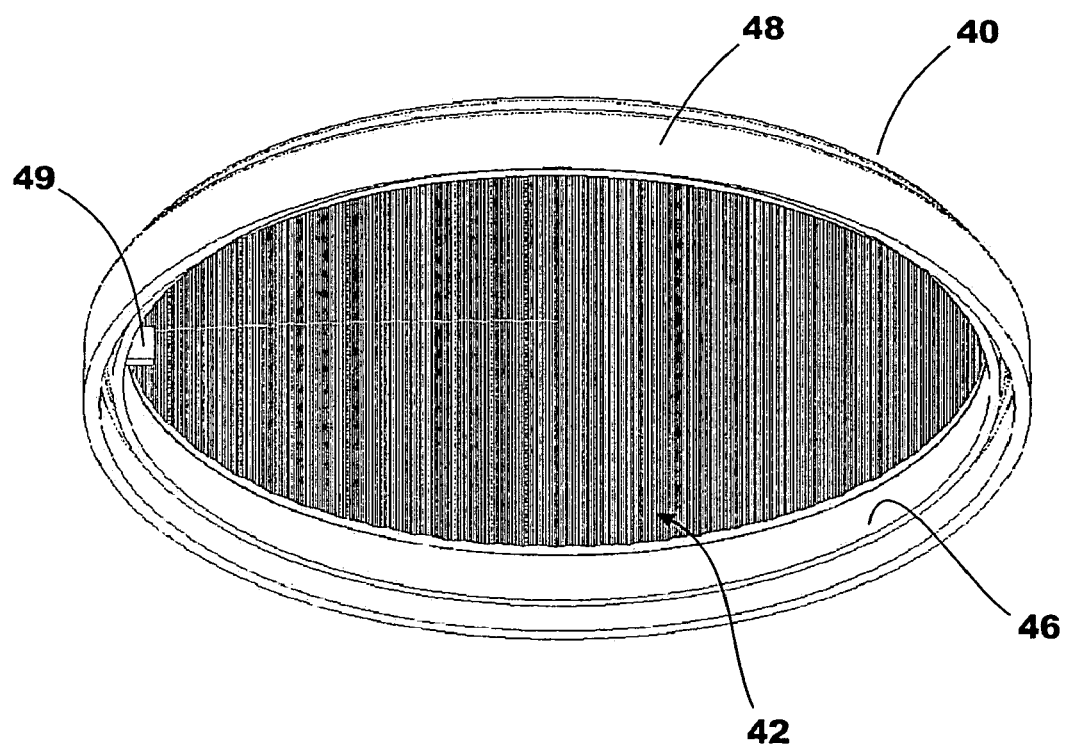
Figure 9B:
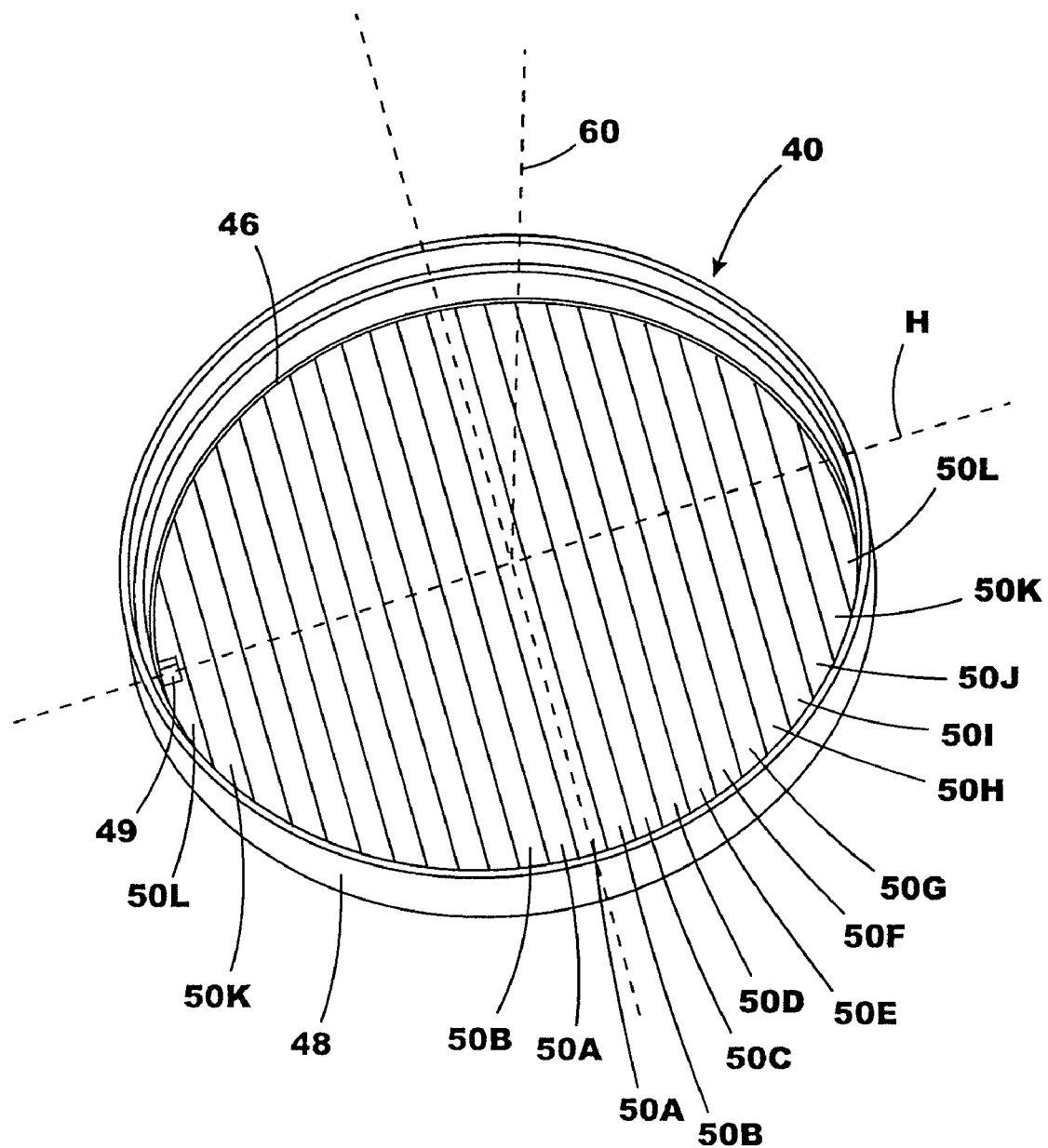

FIG. 9B is similar to FIG. 9A but shows in simplified form the plural linear extrusions of what will sometimes be called the second light distribution surface for the assembly of FIG. 1.

Figure 10:
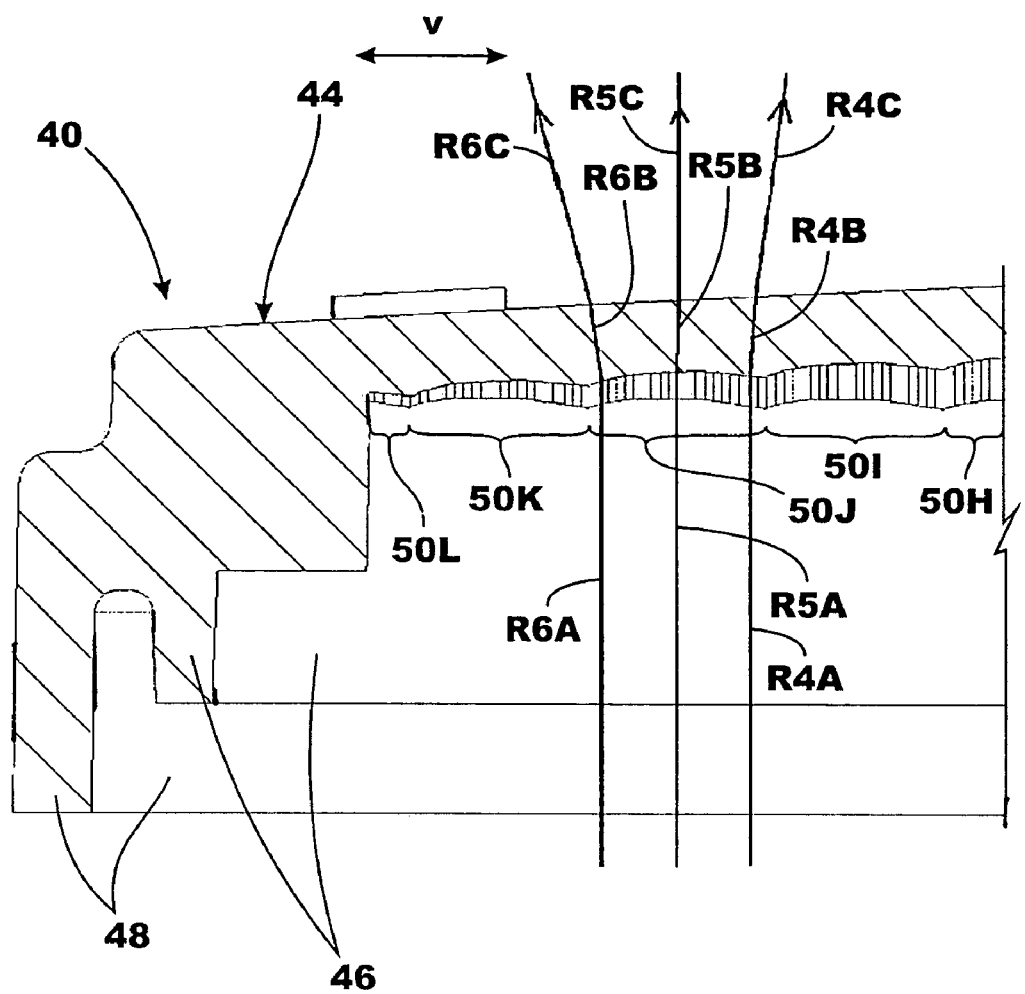

FIG. 10 is a still further enlarged partial sectional view of the cover member of FIG. 9B sectioned along axis H of FIG. 9B, diagrammatically illustrating three individual rays being distributed the V axis by this surface of the reverse lamp.

Figure 11:
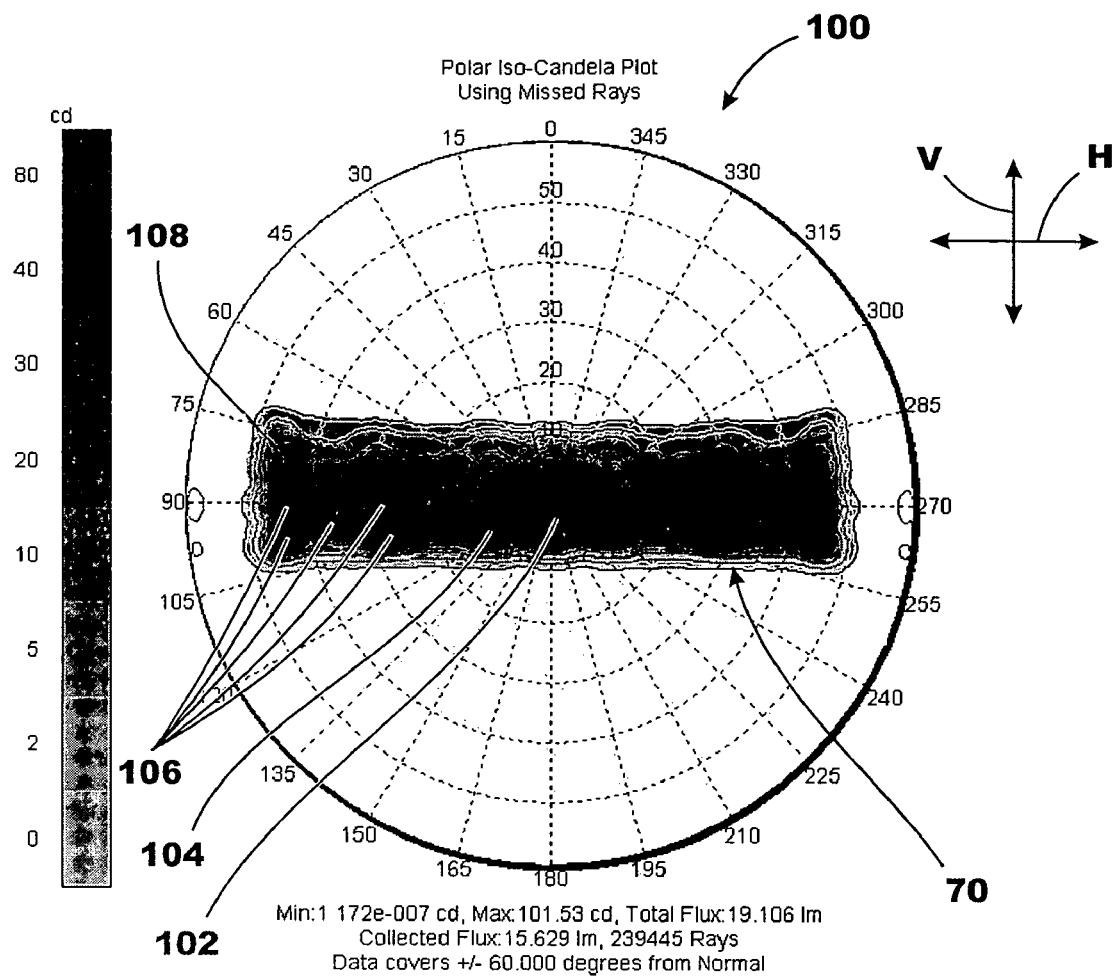

FIG. 11 is a graph of the predicted output distribution of the exemplary embodiment shown in FIG. 1. The hot or higher intensity spots shown are located over the test points in order to generate more headroom over that specification.

IV. DESCRIPTION OF EXEMPLARY EMBODIMENT OF THE INVENTION

A. Overview

For a better understanding of the invention, one exemplary embodiment will now be described in detail. Frequent reference will be made to the above-identified drawings. Reference numerals and letters will be used to indicate parts and locations in the drawings. The same reference numerals and letters will be used to indicate the same parts and locations throughout the drawings unless otherwise indicated.

The exemplary embodiment relates to an improved light-shaping device with wide-ranging applications in limited power applications such as vehicles, portable lamps and specialty lighting. By vehicles we mean things including but not limited to over-land vehicles, watercraft, aircraft and manned spacecraft, including but not limited to automobiles, trucks, boats, ships, buses, vans, recreational vehicles, bicycles, motorcycles, mopeds, motorized cars, electric cars, airplanes, helicopters, space stations, shuttlecraft, and the like. By portable lamps we mean, as examples including but not limited to, camping lanterns, head or helmet mounted lamps as used in mining or spelunking, hand-held flashlights, and the like. By specialty lighting we mean, as examples including but not limited to, street lighting, traffic lights, railroad signals, emergency lighting activated during power failures, etc. However, it is to be understood that the present invention can have even more wide-ranging applicability. And, as previously mentioned, it can be applied to a wide variety of radiant energy types, not just light energy.

In particular, the present exemplary embodiment will be described in the context of providing an energy-efficient method for creating and distributing pseudo-collimated electromagnetic radiation (light) into a pre-determined image for use with vehicles, portable lighting, and emergency lighting. Pseudo-collimated (i.e. nearly collimated) light can be created from nearly any non-collimated source including, but not limited to, incandescent lamps, LEDs, arc and gas discharge lamps, and lasers.

In one exemplary application of the present exemplary embodiment, light from a real world non-collimated source such as an LED or incandescent lamp is collected and substantially collimated into a beam by a collimating surface, optical element, or lens. The pseudo-collimated beam will typically be comprised of a waveform with between 0 and 10 degrees between the peak intensity and the half intensity point. The waveform is typically generally Gaussian in its angular distribution, however, a wide variety of beam profiles are possible with the sole requirement that the beam be substantially collimated. The device is designed such that the beam, once pseudo-collimated by the collimating lens, impinges on a what will be called the first distribution surface designed to distribute the pseudo-collimated light on one of two primary orthogonal axes. In the exemplary embodiment, the first distribution is plus and minus 45 degrees and employs both refractive and internally reflective components in the first distribution surface designed to project the correct intensity proportions for SAE/DOT specifications (available from public sources) for a semi-tractor trailer reverse light (see, e.g., FIG. 4). The light then impinges on what will be called the second distribution surface designed to distribute light in a +5 to −10 degree width with the correct proportions for the SAE/DOT reverse light specification. The resulting output from the three lens combination is rectangular in angle space with an excellent match to the actual energy ratios required for the specification.

As can be appreciated by those skilled in the art, manufacturing of the resulting product may be accomplished through a variety of processes including, but not limited to, injection molding, directly cutting the surface into transparent material and polishing the surface, or cutting directly into a substrate. The surface can be depicted or approximated using any of several parametric and non-parametric surface definition types including, but not limited to, triangular or rectangular planes, non-uniform rational b-spline surfaces (NURBS), high order polynomial fits, and Bezier spline surface types with minimal effect on the resulting device performance. These parametric surfaces may be continuous in nature or the surface may be represented mathematically by many small planar elements. Although some approximation error is acceptable, care should be taken to achieve a sufficiently accurate model and finished component to achieve predicted output performance.

A wide variety of potential computational algorithms can be used to shape the surface elements. The algorithm should take into account the laws of refraction and reflection with particular attention to the percent transmission of the light at higher angles of incidence. Also, the algorithm should be designed to minimize any oscillations in surface shape to reduce difficulties in machining.

B. Exemplary Apparatus

FIG. 1 depicts an exemplary semi-tractor trailer four-inch diameter reverse light embodiment of the present invention in an exploded view. This reverse light assembly 10 is configured to generate a reverse light output pattern according to typical SAE and/or DOT specifications. A single LED light source 20 (e.g. LUXEON LED, available from Lumileds Lighting, LLC of San Jose, Calif., USA) is mounted to a heat sink plate 14. Heat sink plate 14 is composed of aluminum and is used to keep the LED within its operating temperature range in elevated temperature environments. LED 20 and heat sink 14 are mounted into base or housing 12 and are retained in interior 16 of base 12 by screws (not shown) or other mounting methods. LED source 20 emits white light with a spectral distribution compliant with the SAE/DOT requirements for a reverse light. Electrical power is supplied to source 20 through a plug 18 built into base 12. An electrical circuit or components (not shown) can also be mounted in interior 16 of base 12 to manipulate electrical power into a form useable by source 20. Such circuits are well-known to those skilled in the art, and can take on different forms. Note that base 12 includes an alignment tab 19 that extends radially inwardly from the interior 16 of base 12. This tab 19 is useful to align other components of assembly 10 when they are assembled into a reverse light device.

Two other primary components of assembly 10 are a disc-shaped middle member 30 and a circular shaped outer or cover member 40, both of light transmissive or transparent material. Middle member 30 has an outer side wall 36 that fits at least partially into interior 16 of base 12. Correct rotational position of middle member 30, relative to base 12, is ensured by requiring alignment slot 38 on side wall 36 of middle member 30 to mate over alignment tab 19 of base 12. Additionally, middle member has opposite sides. A first side, which faces down towards base 12 when assembly 10 is assembled, will be called the collimator lens or the collimator surface 32 (see FIGS. 2 and 5). It comprises a plurality of concentric circular facets centered about central optical axis 60. The second side, facing away from base 12 and towards cover member 40 when assembly 10 is assembled, is called the first distribution surface 34. It comprises a plurality of parallel linear facets.

Figure 2:
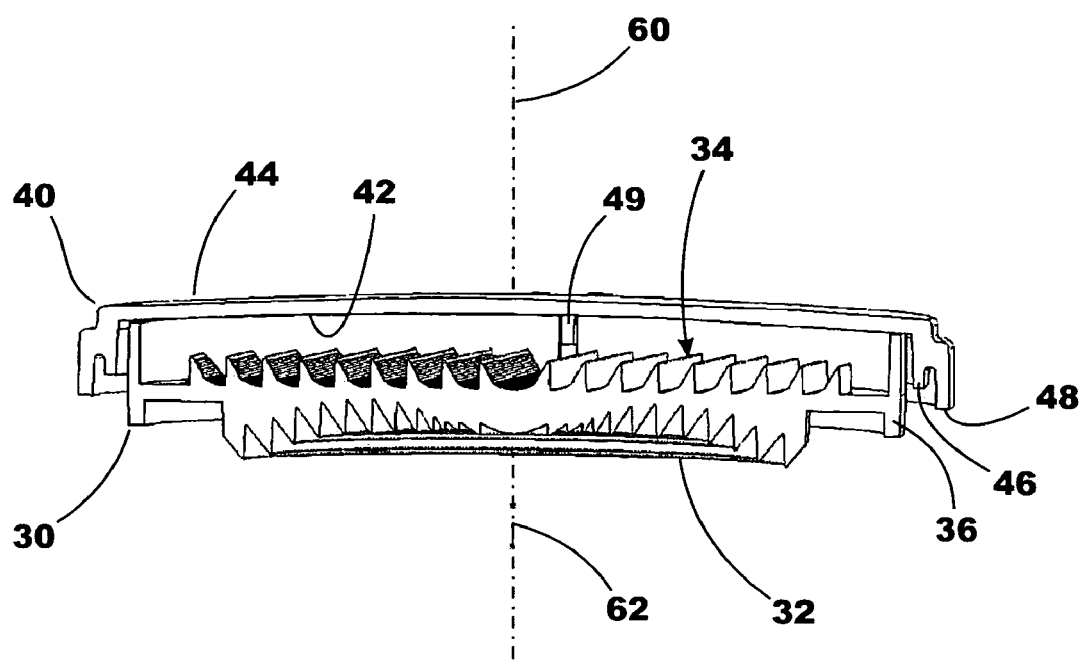

Outer or cover member 40 has inner and outer rims 46 and 48 respectively (see FIG. 2). Side wall 36 of middle member nests inside inner rim 46 when light 10 is assembled (see FIG. 2) and serves to space and position first distribution surface 34 of middle member 30 relative to what will be called second distribution surface 42 (see FIG. 2) on the bottom of outer member 40. The outer surface 44 of outer member 40 is generally smooth and flat, but cooperates with second distribution surface 42 to distribute light (it can be flat or can have some slight curvature, but in this embodiment is designed to allow slight spreading of light from the second distribution surface—e.g. from +/−6 degrees to +/−10 degrees). An alignment tab 49 extends radially inwardly from inner rim 46 of outer member 44. It slides into the top of slot 38 of middle member 30 to ensure correct rotational alignment of outer member 40 relative to inner member 30 and base 12 when light 10 is assembled.

Light 10, when assembled, is a self-contained four inch diameter semi-tractor trailer reverse light assembly ready for installation in a mating opening on such a trailer. Electrical operating power would come from the semi-tractor battery supply (e.g. 12 or 24 VDC) via wires to the back of the trailer.

As illustrated in FIGS. 1 and 2, the central optical axis 60 is generally orthogonal and centered relative to collimator surface 32, first distribution surface 34, and second distribution surface 42 when light 10 is assembled. Note that, for purposes of this description, addition reference axes V and H are indicated in the drawings. Axes V and H are in the same plane and are generally orthogonal to central optical axis 60. Axis V will be generally vertical and axis H generally horizontal when light 10 is in operating position (see FIG. 4). Thus, central optical axis 60 will also be generally horizontal but point in the direction of the output light pattern of light 10, when light 10 is in operating position (see FIG. 4).

LED 20 is mounted in base 12 along central optical axis 60. Light from LED device 20 is directed upward toward middle member 30 and its collimation surface 32 and first distribution optic or surface 34. Collimator surface 32 substantially collimates the otherwise spherical or semi-spherical output of LED 20 to create a pseudo-collimated beam. First distribution surface or optic 34 collects the maximum amount of LED energy from the pseudo-collimated beam and directs it into a pattern represented by a + to −45 degree spread angle along the H or horizontal axis, with a very narrow vertical spread angle. If the pattern were projected on a surface, at this point it would appear as a line with varying intensities. Shaping distribution optic 34 was specifically designed and controlled to generate the required intensity distribution output in this plane. In other words, the specific optical properties of first distribution surface 34 were designed to produce specific intensities at specific points along that vertically narrow, but horizontally spread, vertically narrow line or beam created by surface 34.

The output light from this first optic or distribution surface 34 is directed into the second optical or distribution surface 42, which distributes (with outer surface 44) the light in the vertical direction, i.e. spreads it relative the V axis. Again, shaping of this second surface was specifically designed and controlled to keep the same proportionality of intensity distribution in the pattern as was in the relatively wide horizontal, relative narrow vertical pattern generated by first distribution surface 34. In other words, the beam pattern after second distribution surface 42 essentially maintains the horizontal spread (+/−45 degrees on either side of axis V along central optical axis 60) and intensity distribution of first distribution surface 34, but widens it from a very vertically narrow horizontally spread line to a beam spread of approximately 5 to 20 degrees on other side of axis H, while retaining proportionality of relative intensity along the horizontal spread as it existed in the narrow horizontal line created by first distribution surface 34. The beam is stretched or spread slightly vertically but the relative intensities along that narrow horizontal line are basically maintained. The outer side 44 spreads light slightly.

FIG. 2 depicts, in more detail, the components comprising the improved light distribution apparatus and the collimator element. The components and their features are shown roughly to scale. The device is basically four inches across. Middle member 30 nests into outer cover member 40. Outer cover member 40 is attachable to base 12 so that middle member 30 is internal. Therefore, all the shaped optic surface 32, 34, and 42 would be basically sealed inside light assembly 10 against the normal environment experienced by the light. The source focal point is located at reference number 62. Light originates from this point and is directed toward collimator surface 32 (formed in the entrance side of middle member 30). The light beam is substantially collimated when inside the transparent substrate of first or middle member 30. This collimated light then strikes first distribution surface 34 (formed in the exit side of middle member 30) of the present invention and, as described above, is spread into the required horizontal distribution. The second distribution surface 42, and outer surface 44, in outer member 40 are then used to spread the light orthogonally to surface 34 in the vertical direction.

In light 10, members or components 30 and 40 are separate pieces and independent of each other, but combined when assembled as shown in drawings. However, variations are possible regarding the configuration, arrangement, and components used to accomplish the functions indicated.

Figure 3:
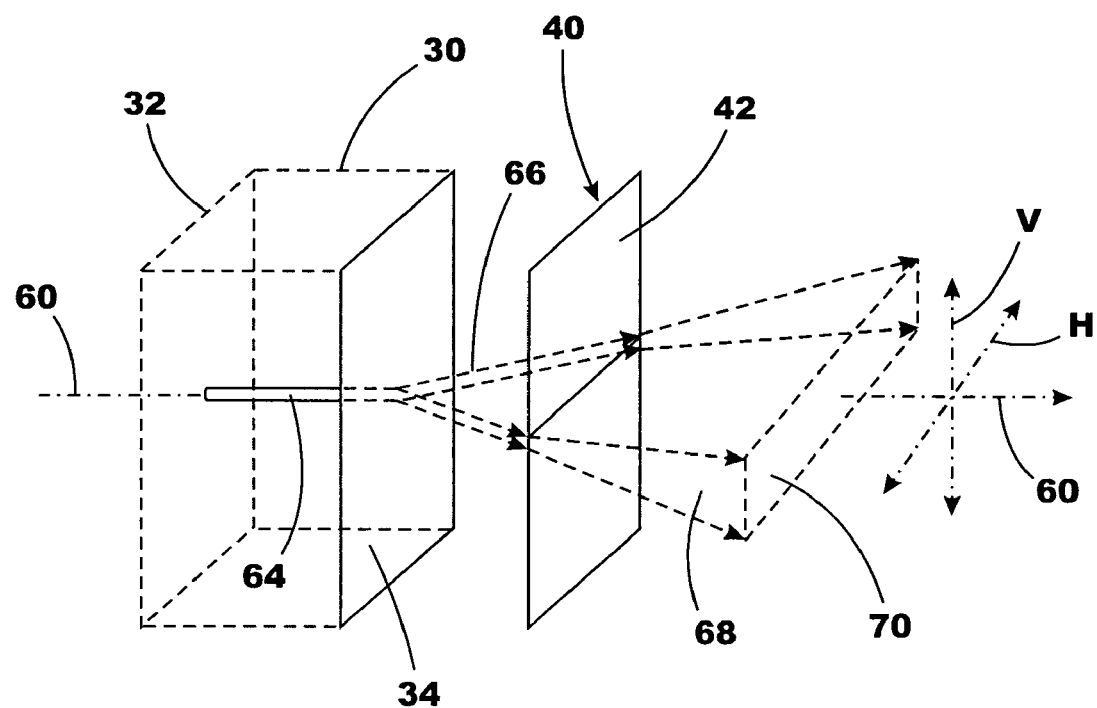
FIG. 3 is a diagrammatic illustration of how the assembly of FIG. 1 alters light from an LED light source into, first, a collimated beam, and then further modifications by subsequent elements to create a rectangular output pattern.

FIG. 3 is a simplified diagram of the optical system in action. Source 20 is again illustrated at focal point 62. Light from source 20 that travels to collimator surface 32 is pseudo-collimated (diagrammatically represented as the tight beam 64 in FIG. 3). Collimated beam 62 travels through middle member 30 and strikes first distribution surface 34 represented by a plane in FIG. 3. Distribution surface 34 is designed to spread the light in the horizontal direction (in the direction of axis H) by +/−45 degrees from optical axis 60, as shown by the expanded beam 66 in FIG. 3. It can be seen that beam 66 was not expanded in the vertical direction (axis V) by first distribution surface 34. The horizontally expanded beam 66 then progresses to second distribution surface 42, in FIG. 3 represented by the left side of member 40. Beam 66 is spread by second distribution surface 42 and outer surface 44 in the vertical direction (along axis V) independently of the horizontal spread, resulting in a rectangular output distribution 70 of the light energy 68. Thus, FIG. 3 gives a diagrammatic depiction of how pseudo-collimated light can be controlled into a rectangular output pattern.

Figure 4:
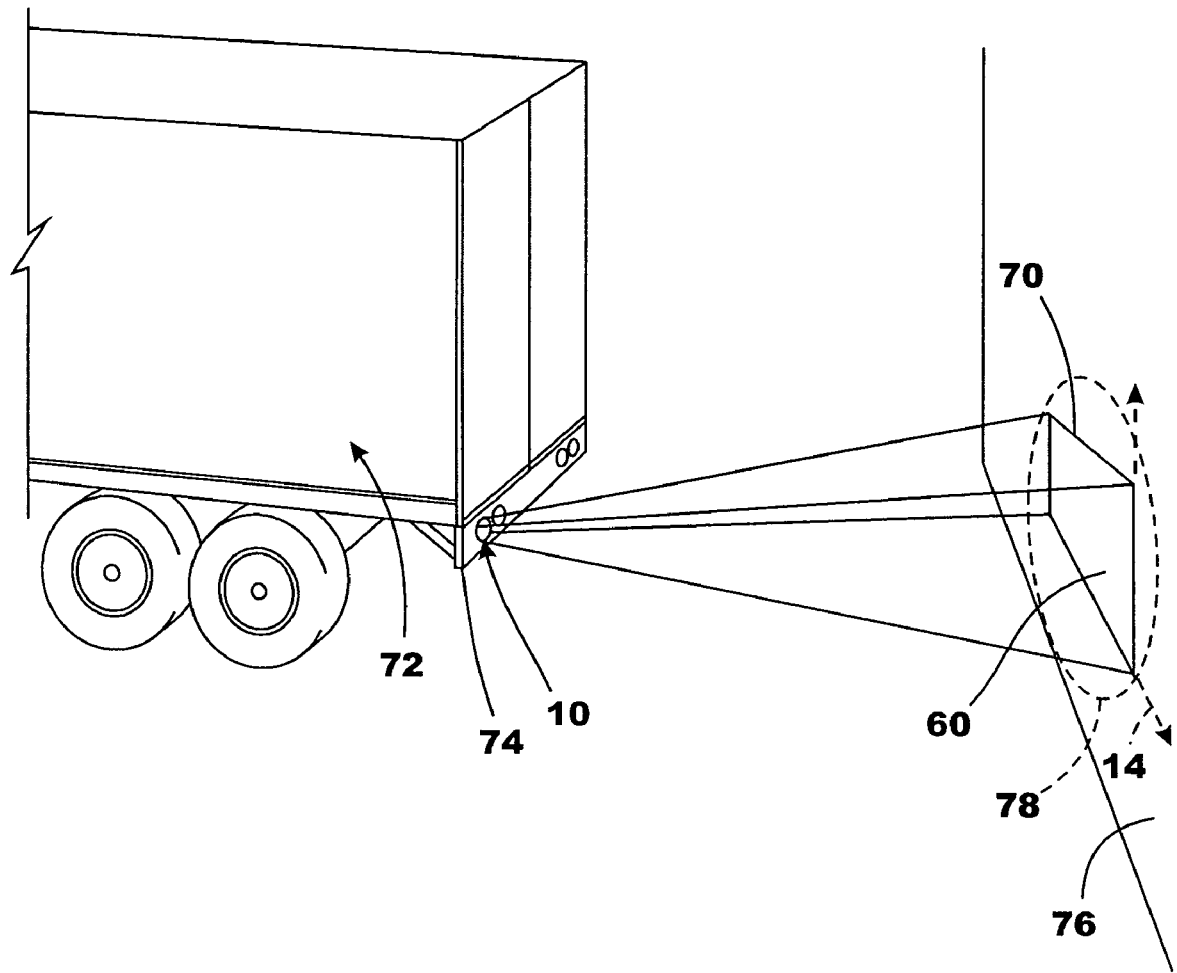
FIG. 4 is a diagrammatic depiction of installation of the assembly of FIG. 1 as a reverse light on a semi-tractor trailer, and its output pattern projected onto a vertical wall.

FIG. 4 illustrates diagrammatically the concept of round-shaped housing and outer cover of light assembly 10, mounted on bumper 74 of semi-tractor trailer 72, and creating the rectangular pattern 68 in angle space. FIG. 4 shows rectangular pattern 68 projected on a vertical wall 76 behind the semi-tractor trailer 72 to create projected pattern 70. Axes V and H are superimposed over light 10 in FIG. 3. Axes VI and HI are shown relative to wall 76 (the image plane for light 10) and are parallel to axes V and H. FIG. 4A also diagrammatically illustrates with dashed line 78 a conventional prior art reverse light circular output pattern, showing how the prior art solution exceeds the boundaries of the required rectangular pattern.

C. Operation

More specifics of light assembly 10, its components, and how they operate to generate rectangular pattern 68 in angle space, are discussed below with additional reference to FIGS. 5-11. As can be seen in the diagram of FIG. 3, pattern 68 in angle space is a beam of light having rectangular cross-section at all points and diverging slightly from it exit surface 44. It would project as a rectangle (reference number 70) on a generally orthogonal surface, such as wall 76 of FIG. 4.

Figure 5:
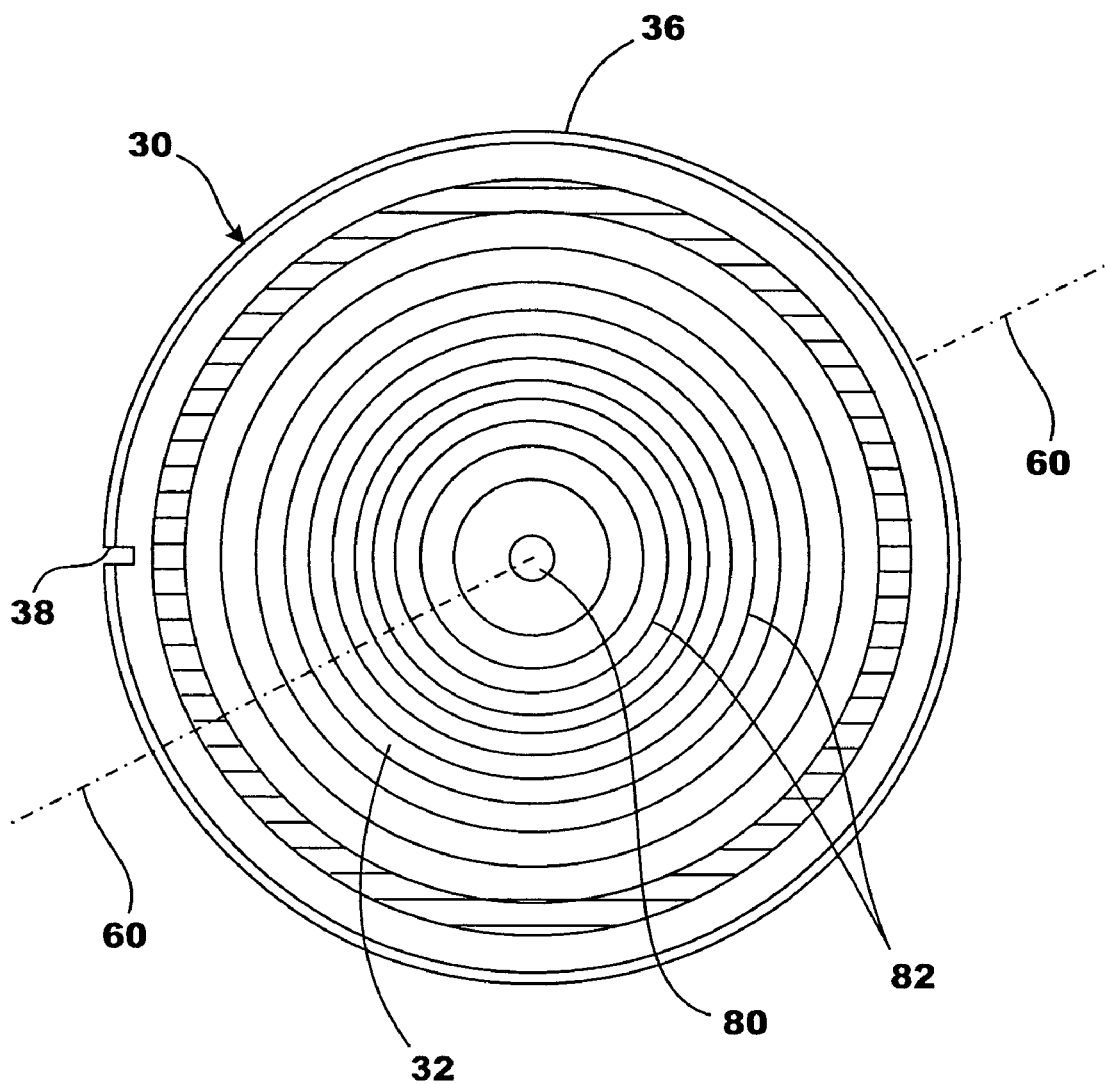
FIG. 5 is an isolated perspective view of the concentric rings collimating surface on one side of the middle member of the assembly of FIG. 1.

FIG. 5 illustrates more specifically the circular concentric shaped facets 82 of collimator surface 32 of middle member 30. Note there is also a convex portion 80 on center optical axis 60. Facets 82 concentrically surround center portion 80. Note also how linear facets 92 (shown in dashed lines as they are on the opposite side of middle member 30 in the view of FIG. 5) are aligned relative axes V and H. Facets 92 are generally parallel with axis V but perpendicular to axis H to spread light horizontally, i.e. along axis H. Note how facets 92 extend beyond the perimeter of outermost facet or ring 82 of surface 34.

FIGS. 6 and 7A show more specifics about the precise nature of collimator surface 32 and first distribution surface 34 of middle member 30. Center convex portion 80 of collimator surface 32 is surrounded by a first, inner-most circular facet 82A, followed outwardly by succeeding circular concentric facets 82B-L respectively, with outermost concentric facet 82L spaced somewhat inwardly from side wall 36 of middle member 30. Each facet 82 is tooth-shaped in cross-section (see FIGS. 6 and 7A). Note that succeeding facets are usually as long as or longer than preceding facets, and that all the tips or peaks of each facet are not in the same plane, nor are the depressions or troughs between adjacent facets in the same plane. This exposes the inner facing surfaces of facets 82 to as much of the source light as possible, to capture and collect it to get as much light from the source into the output pattern as possible.

FIGS. 6 and 7A also show how facets 92A-I, in contrast to facets 82, are generally parallel and linear and evenly spaced apart, except for a larger spacing 90 along center of surface 34. Facets 92 are also somewhat tooth-shaped in cross-section (see FIG. 6) with sharp peaks but sloped troughs between facets. Also, the number of facets 92 is symmetrical on each side of middle space or trough 90, but they are mirror-images. The less sloped side of each facet 92 faces towards middle trough 90. The steeper or shear side of each facet 92 faces is on the opposite side of the facet.

FIG. 7B is a cross-sectional representation of three rays (reference numbers R1, R2, and R3 respectively) passing through middle member 30. Light originates from source 20 at focal point 62 and is directed toward collimator surface 32 (shown here in cross-section). Initial rays R1, R2, and R3 travel through air (see first portions R1A, R2A, and R3A) but then strike various portions of standard collimator element or surface 32 and are directed in a collimated fashion into the material of middle member 30 by the shapes of facets 82. Note how the generally increasingly downward extension of facets 82 from middle to outside capture light emanating from point 62, and expose the generally parallel inner sides of facets 82 to that light. The rays inside the material of middle member 30 are visibly parallel (see portions R1B, R2B, and R3B in FIG. 7B) and strike, from the inside of middle member 30, the shaped boundary of first distribution optic or surface 34. Each ray is directed by facets 82 of surface 34 at slightly different angles depending on where outer surface 34 is struck. Certain rays (ray R2) just refract at surface 34 and exit from the material (see portion R2C of the ray path of ray R2). Others (rays R1 and R3) both internally reflect with total internal reflection or "TIR" (see portions R1C and R3C) and then refract at surface 34 and exit the material (see portions R1D and R3D). Rays R1-R3 indicate what would happen for light traveling to one side of middle member 30. Because the other side of member 30 is a mirror image, the same thing would happen regarding light going to the other side of middle member 30 in FIG. 7B, but is not shown for simplicity.

FIG. 8A is a close up view of a portion of first distribution surface 34. There can be seen two visibly different sections 94 and 96/98 of surface 34. Section 94 is a refractive section that uses refraction alone to redirect incident collimated light rays into the required output distribution. This surface can be designed for a wide range of angles but is only efficient for deflections up to approximately 30 degrees from the original collimated light. The section 96/98 is a much steeper section and employs both internal reflection and then refraction to direct light into a substantially wider pattern.

FIG. 8B is similar to FIG. 8A but depicts diagrammatically two individual rays R2 and R3 as they pass through the refractive portion 94 and reflective/refractive portion 96/98 of first distribution optic 34. The collimated beam portion R2B of ray R2 strikes the lens surface 34 from internally at point 95. Middle member 30 in this embodiment is polycarbonate having a refractive index of 1.58, and bends the exiting light away from normal along path R2C. In the exemplary embodiment, the shape of surface 34 is such that the light is directed in the correct proportions throughout the pattern from 0 to 27 degrees.

Also shown in FIG. 8B is a second collimated ray R3 having a portion R3B that strikes surface 34 (from the interior of middle member 30) along the reflective portion 96 at point 97. The angle of the surface normal to the inbound light ray portion R3B is designed such that total internal reflection occurs and the light is 100% reflected along path R3C. Ray portion R3C, which is still inside the material, strikes the exit surface 98 at point 99 and is refracted along path R3D toward the intended point in the output pattern 68. Note how it subtends a much wide angle.

FIGS. 5-8B therefore illustrate how light from LED source 20 is pseudo-collimated and then spread along axis H in a predetermined pattern of varying intensities.

FIGS. 9A, 9B, and 10 are more detailed views of output lens or member 40 of the exemplary embodiment. The inner or second distribution surface 42 of lens 40 is comprised of refractive-only shapes 50 which, in combination with outer surface 44, distribute the light energy in the vertical direction, or opposite to the distribution of first distribution surface 32.

As shown in FIGS. 9A and B, shapes 50 are parallel and linear across member 40. For consistency with first distribution surface 34, shapes 50 are indicated by use of reference numbers 50A-50K for each half of member 40, starting with 50A for the shapes on each side of axis V (which splits member 40 in half). Each set of shapes 50A-50K is basically a mirror image of the other set. Note how shapes 50 are parallel to axis V and perpendicular to axis H.

FIG. 10 is a close-up view of a cross-section of a portion of outer lens element 40 of FIGS. 9A and B and illustrates how member 40 spreads light along axis V. Three rays R4, R5, and R6 are shown with first portions R4X, R5X, and R6X parallel, which represents rays that have passed through collimator surface 32 and first distribution surface 34. Because first distribution surface 34 spreads the collimated light only in the horizontal plane, the three rays R4, R5, and R6 appear parallel when viewed in the vertical plane, as in FIG. 10. As a further explanation, rays R4, R5, and R6 are spread by first distribution optic 34 into and out of the page of FIG. 10 from −45 to +45 degrees. Portions R4X, R5X, and R6X of rays R4, R5, and R6 impinge on second distribution surface 42 at points 51, 52, and 53 and are refracted along paths R4Y, R5Y, and R6Y, which are inside the transparent material of outer lens 40. As the rays exit outer surface 44 of member 40 (at points 57, 58, and 59) they are further refracted in the vertical direction along paths R4Z, R5Z, and R6Z, but intensity is controlled in the output pattern.

Therefore, FIGS. 9 and 10 illustrate how vertical spreading of the light beam is accomplished. The vertical spread is relatively small (e.g. less than +/−40 degrees of the axis H, and likely less than +/−30 degrees). It can be on the order of a few degrees on either side of the optical axis or both sides. Or it could be no vertical spread on one side of the axis and any where from a degree to an end limit on the other side. It therefore creates a rectangular pattern 68 (projected as pattern 70, see FIGS. 3 and 4A). As can be appreciated, the exact shape of pattern 68 can vary by the particular design of the optics of assembly 10.

Graph 100 of FIG. 11 illustrates how the rectangular pattern 68 can project onto a surface into a two dimensional rectangular pattern 70 with an intensity distribution or pattern that complies with the SAE/DOT regulations for a reverse light. Note how regions 102, 104, 106 and 108 on the left half of pattern 70 are of highest intensity. Those regions basically are generally equally spaced apart from right to left and extend from the bottom to top of pattern 70. These regions basically line up with required minimum intensity points in the rectangular output for SAE/DOT regulations for reverse lights.

This shows how assembly 10 allows easy design of a reverse light to meet those regulations. The first distribution surface 34 can achieve the needed horizontal spread of pattern 70. Additionally first distribution surface 34 can have facets which concentrate or distribute intensity in horizontally spaced apart regions. Then second distribution surface can be designed to stretch the thin, horizontal pattern vertically to complete the required rectangular shape in the correct width to height proportion, while additionally, keeping the intensity for certain regions proportional to what the regulations call for. Essentially, the first distribution surface 34 achieves the right horizontal beam spread and correct intensities along the horizontal axis. The second distribution surface 42 then only has to stretch or expand the beam vertically. This vertical expansion keeps the relative intensities along the horizontal axis of the beam generally in place and proportion. The vertical expansion therefore sweeps the horizontal distribution along the vertical axis.

It can therefore be seen how the exemplary embodiment meets stated objects, features, advantages, or aspects of the invention. This embodiment of light 10, as a semi-tractor trailer reverse light, can be molded from plastics and utilize other economic components. A single LED can be the source for the device. It can retain the look of, and be installed or retrofitted on, existing mounting openings or structure for four inch reverse lights, and look like a standard, incandescent four-inch reverse light. It takes LED radiant energy, pseudo-collimates it, and manipulates the pseudo-collimated light efficiently and effectively into a pre-determined different shape of controlled intensity distribution. It can be designed to meet intensity minimums for the output pattern.

The exemplary embodiment comprises an optical apparatus including two orthogonally acting surfaces for the purpose of shaping a pseudo-collimated beam into a rectangular output distribution. Each surface acts on mutually orthogonal directions and is relatively independent of the other surface. The surfaces have useful limits in angular output which can be described as follows: at least one light distribution surface designed to spread light on a plane having an output angle deviation of between 25 and 90 degrees in either or both directions from the optical axis. If both surfaces require less than 25 degrees then a common single pillow optic might be preferred. A second light distribution surface is designed to spread the light in a plane orthogonal to the first surface having an output distribution angle of less than 40 degrees from the optical axis in both directions. The lens system becomes very inefficient at about 30 degrees, but it is still operable at higher angles).

The exemplary embodiment includes a third optical surface, the collimating surface, to essentially define a three lens surface system for shaping the original non-collimated light into the efficient pattern.

It can be seen that even if made from multiple pieces or components, the pieces of light assembly 10 can be made and assembled economically. Essentially two pieces provide a three lens efficient optical manipulation of light from source 20. The cost of such an assembly can be several times less expensive as existing LED reverse lights.

D. Options and Alternatives

It will appreciated that the foregoing exemplary embodiment is but one form the invention can take. Variations obvious to those skilled in the art will be included within the invention. The invention is described solely by the claims. The examples in this disclosure are not intended to, and do not, limit the scope of the invention.

For example, variations in materials, dimensions, configurations, and application of the aspects of the invention are possible.

Different light sources can be used. More than one light source is possible.

The invention can be implemented as a reverse light, as other automotive type lights requiring certain output patterns, or for other lighting applications, as indicated previously.

The perimeter shape of the housing or the lens components can vary. For example, they could be oval or even other shapes.

Either the first distribution surface 34 or the second distribution surface 42 may come first, i.e. first surface less than +−40 degrees and the second surface between 25 and 90 degrees.

Assembly 10 uses essentially three lenses; one to pseudo-collimate, the other two to shape that beam each in a different direction. Just two lenses would be needed, of course, if the source light did not need to be collimated or was collimated or pseudo-collimated by other means. Those two lenses could be implemented into a single piece, instead of two.

What is claimed is:

1. An apparatus to convert pseudo-collimated electromagnetic energy from a light source comprising a light emitting diode (LED) directed along a central optical axis into a non-imaging predetermined output in angle space comprising:
   a. a first surface adapted to distribute the pseudo-collimated radiant energy over a limited angular range relative to a central optical axis with pre-determined intensity distribution;
   b. a second surface adapted to distribute the energy generally orthogonally by sweeping the energy distributed from the first surface over a limited range relative to a second axis with pre-determined intensity distribution.

2. The apparatus of claim 1 wherein the pre-determined intensity distribution is correlated to specific angular regions of the energy.

3. The apparatus of claim 2 wherein the pre-determined intensity distribution for each specific angular region of the energy remains proportional relative to each separate axis after the first surface and after the second surface.

4. The apparatus of claim 3 wherein the specific angular regions are distributed throughout the predetermined output in angle space.

5. The apparatus of claim 4 wherein the predetermined output comprises an intensity distribution and pattern set by industry or government regulations.

6. The apparatus of claim 1 wherein the first surface comprises a plurality of shaped linear distribution elements.

7. The apparatus of claim 6 wherein the each linear distribution element is refractive or has total internal reflection or both.

8. The apparatus of claim 1 wherein the pseudo-collimated radiant energy is collimated by a third surface.

9. The apparatus of claim 8 wherein the third surface is on an opposite side of a first member comprising the first surface.

10. The apparatus of claim 8 wherein the second surface is on a second member that is separate from the first member.

11. The apparatus of claim 1 wherein the electromagnetic energy comprises visible light.

12. The apparatus of claim 1 wherein the electromagnetic energy comprises non-visible light.

13. The apparatus of claim 12 wherein the non-visible light comprises infrared light.

14. The apparatus of claim 12 wherein the non-visible light comprises ultraviolet light.

15. The apparatus of claim 1 wherein the LED is adapted to emit white light.

16. The apparatus of claim 1 further comprising a heat sink operatively connected to the LED to remove heat from the LED when operating.

17. The apparatus of claim 1 further comprising a light source which meets minimum intensity requirement for a semi-tractor trailer reverse light.

18. The apparatus of claim 1 wherein the pseudo-collimated source comprises a beam diameter of 0 to 10 degrees between peak intensity and one-half intensity.

19. The apparatus of claim 1 wherein the pseudo-collimated source is generally Gaussian in angular distribution.

20. The apparatus of claim 6 wherein the linear distribution elements comprise linear extrusions generally orthogonal to the central optical axis.

21. The apparatus of claim 20 wherein the linear extrusions are generally parallel to one another.

22. The apparatus of claim 21 wherein the linear extrusions are non-uniform.

23. The apparatus of claim 22 wherein the linear extrusions comprises a plurality of generally outward extending linear facets each having a peak, a proximal side, and a distal side relative the central optical axis and a trough between adjacent peaks.

24. The apparatus of claim 23 wherein the troughs are generally orthogonal to the central optical axis but somewhat curved and inclined relative the central optical axis.

25. The apparatus of claim 23 wherein the proximal side of each peak is sloped closer to parallel to the central optical axis than orthogonal to the central optical axis.

26. The apparatus of claim 23 wherein the distal side of each peak is generally parallel to the central optical axis.

27. The apparatus of claim 23 further comprising a central trough inclined in opposite directions from the central optical axis.

28. The apparatus of claim 23 wherein said pseudo-collimated light incident on the facets is internally reflected by the proximal side of the facet and refracted by the distal side of the facet in a manner tending to spread the pseudo-collimated light outwardly from the second axis along a plane perpendicular to the linear facets of the first surface.

29. The apparatus of claim 28 wherein the facets are designed to produce areas of varying intensity in the light spread in the plane perpendicular to the linear facets surface.

30. The apparatus of claim 18 wherein the light spread is approximately 0 to 90 in the plane on one or both sides of the central optical axis.

31. The apparatus of claim 1 wherein the second surface comprises a plurality of linear distribution elements.

32. The apparatus of claim 31 wherein the plurality of linear distribution elements comprise linear extrusions.

33. The apparatus of claim 32 wherein the linear extrusions comprise a plurality of inwardly facing linear facets each having a peak and a trough between adjacent peaks.

34. The apparatus of claim 33 wherein the troughs are generally orthogonal to the central optical axis but somewhat curved and inclined relative the central optical axis.

35. The apparatus of claim 34 wherein the troughs are relatively concave or relatively convex to the first surface.

36. The apparatus of claim 35 wherein incident relatively parallel rays of light in a plane traverse to the parallel linear facets are spread in that plane.

37. The apparatus of claim 36 wherein said light spread is approximately +/−40 degrees in the plane on either side of the central optical axis.

38. The apparatus of claim 8 wherein the third surface comprises a plurality of concentric revolved extrusions.

39. The apparatus of claim 38 wherein the extrusions comprise facets each having a proximal side to the central optical axis which is closer to parallel to the central optical axis than perpendicular, a peak, and a distal side sloped away from parallel to the central optical axis and troughs between adjacent facets.

40. The apparatus of claim 39 wherein light rays from an uncollimated source are slightly refracted by the proximal sides and the refracted rays are, by total internal reflection, reflected by the distal sides which are sloped relative the source rays to generally collimate the rays to produce said pseudo-collimated light.

41. The apparatus of claim 39 wherein the third surface is on a side of a member which comprises said first surface on its opposite side.

42. The apparatus of claim 1 wherein the first and second surfaces are orthogonal.

43. The apparatus of claim 42 wherein the first and second surfaces are formed in separate members.

44. The apparatus of claim 1 wherein the first and second surfaces are molded.

45. The apparatus of claim 1 wherein the first and second surfaces are shaped from a solid member.

46. The apparatus of claim 1 wherein some manipulative of light by the first or second surfaces is solely by refraction.

47. The apparatus of claim 46 wherein some manipulative of light by the first or second surfaces is by refraction and totally internal reflection.

48. The apparatus of claim 1 wherein the first and second surfaces are implemented on independent components adapted to be assembled into a housing.

49. The apparatus of claim 1 wherein the intensity to predetermined angular regions of the output pattern of the first distribution surface remains proportional and is swept through an angular range by the second distribution surface.

50. The apparatus of claim 49 wherein the intensity at predetermined regions of the output pattern are near ideal ratios.

51. The apparatus of claim 1 wherein the apparatus is incorporated into a lighting device that utilizes said predetermined output pattern.

52. The apparatus of claim 51 wherein the predetermined output pattern comprises minimum photometric values at test points in the pattern.

53. The apparatus of claim 52 wherein the minimum photometric values are compliant for relevant industry or government regulations for a pattern and application of the pattern.

54. The apparatus of claim 53 wherein the values exceed regulations for relevant points in the pattern.

55. The apparatus of claim 52 wherein the first surface spreads the pseudo-collimated light over a range +/−45 degrees in generally a first plane with points of varying intensity.

56. The apparatus of claim 55 wherein the second surface spreads light from +/−40 degrees in a second plane orthogonal to the first plane with the points of varying intensity retaining proportional intensity.

57. The apparatus of claim 51 wherein the lighting device comprises an automobile light.

58. The apparatus of claim 57 wherein the automobile light is a back-up light.

59. The apparatus of claim 58 wherein the back-up light is adapted for use on a semi-tractor trailer.

60. The apparatus of claim 59 in combination with a semi-tractor trailer.

61. The apparatus of claim 51 wherein the lighting device comprises a light for an aircraft, space craft, or marine craft.

62. The apparatus of claim 51 wherein the lighting device comprises a portable lamp, a permanent lighting lamp, an emergency light, or a street light.

63. The apparatus of claim 44 wherein the first and second surfaces are plastic.

64. The apparatus of claim 1 wherein the first and second surfaces are made from polycarbonate, acrylic, glass, or polystyrene.

65. The apparatus of claim 1 in combination with a vehicle.

66. An apparatus to distribute light energy in a predetermined output pattern in angle space comprising:
   a. two generally orthogonal swept or extruded surfaces adapted to reshape pseudo-collimated light into a generally rectangular output pattern defined relative to first and second axes;
   b. wherein the light is distributed within useful limits that are +/−1 degree to +/−90 degrees relative to the first axis or the first and second axes;
   c. wherein the surfaces are orthogonal and on separate pieces or components.

67. The apparatus of claim 66 wherein the useful limits comprise +/−25 degrees to +/−90 degrees relative to the first axis or the first and second axes.

68. The apparatus of claim 66 wherein the useful limits comprise less than or equal to +/−40 degrees relative to the first and second axes.

69. The apparatus of claim 66 wherein the useful limits comprises less than or equal to +/−30 degrees relative to the first and second axes.

70. The apparatus of claim 67 wherein the +/−25 degrees to +/−90 degrees useful limit is accomplished by a first of the said two orthogonal surfaces.

71. The apparatus of claim 67 wherein the +/−25 degrees to +/−40 degrees useful limit is accomplished by a first of the said two orthogonal surfaces.

72. The apparatus of claim 66 in combination with a vehicle.

73. A method of creating a predetermined output pattern in angle space from a single pseudo-collimated LED light source comprising:
   a. distributing energy from the pseudo-collimated energy source into regions of predetermined varying intensity into a beam of a limited angular range relative to a first axis;
   b. distributing energy from the beam of step (a) into a limited angular range relative to a second axis generally orthogonal to the first axis to create said predetermined output pattern retaining swept proportionality of the regions of predetermined varying intensity;
   c. wherein the output pattern is generally rectangular.

74. The method of claim 73 wherein the pseudo-collimated radiant energy is from a single source.

75. The method of claim 73 wherein the pseudo-collimated radiant energy is from plural sources.

76. The method of claim 73 wherein the LED is pseudo-collimated by a refractive and total internal reflection surface.

77. The method of claim 76 wherein the surface comprises concentric extrusions.

78. The method of claim 73 wherein the method is used to produce a back up light pattern for an automotive vehicle.

79. The method of claim 78 wherein the energy source is white visible light.

80. The method of claim 73 wherein the first distribution is from a first surface with linear distribution elements aligned in parallel relative a first direction.

81. The method of claim 80 wherein the second distribution is from a second surface with linear distribution elements aligned generally orthogonal to the first direction.

82. The method of 80 wherein the first and second surfaces are physically separate.

83. The method of claim 73 wherein the distribution from the first surface is +/−25 to +/−90 degrees.

84. The method of claim 83 wherein the distribution from the second surface is less than +/−40 degrees.

85. An apparatus to convert electromagnetic pseudo-collimated radiant energy from a light source directed along a central optical axis into a non-imaging predetermined output in angle space comprising:
   a. a first surface adapted to distribute the pseudo-collimated radiant energy over a limited angular range relative to a central optical axis with pre-determined intensity distribution;
   b. a second surface adapted to distribute the energy generally orthogonally by sweeping the energy distributed from the first surface over a limited range relative to a second axis with pre-determined intensity distribution; and
   c. wherein the predetermined output in angle space from the light source meets minimum intensity requirements for a semi-tractor trailer reverse light.

86. An apparatus to convert pseudo-collimated radiant energy from a pseudo-collimated source comprising a beam diameter of 0 to 10 degrees between peak intensity and one-half intensity directed along a central optical axis into a non-imaging predetermined output in angle space comprising:
   a. a first surface adapted to distribute the pseudo-collimated radiant energy over a limited angular range relative to a central optical axis with pre-determined intensity distribution;
   b. a second surface adapted to distribute the energy generally orthogonally by sweeping the energy distributed from the first surface over a limited range relative to a second axis with pre-determined intensity distribution.

87. An apparatus to convert pseudo-collimated radiant energy directed along a central optical axis into a non-imaging predetermined output in angle space comprising:
   a. a first surface adapted to distribute the pseudo-collimated radiant energy over a limited angular range relative to a central optical axis with pre-determined intensity distribution;
   b. a second surface adapted to distribute the energy generally orthogonally by sweeping the energy distributed from the first surface over a limited range relative to a second axis with pre-determined intensity distribution; and c. a third surface adapted to create the pseudo-collimated radiant energy, the third surface comprising a plurality of concentric revolved extrusions.

88. A method of creating a predetermined output pattern in angle space from a single pseudo-collimated radiant energy LED light source which is pseudo-collimated by a refractive and total internal reflection surface, the surface comprising concentric extrusions, comprising:
   a. distributing energy from the pseudo-collimated energy source into regions of predetermined varying intensity into a beam of a limited angular range relative to a first axis;
   b. distributing energy from the beam of step (a) into a limited angular range relative to a second axis generally orthogonal to the first axis to create said predetermined output pattern retaining swept proportionality of the regions of predetermined varying intensity;
   c. wherein the output pattern is generally rectangular.

89. An apparatus to convert pseudo-collimated radiant energy directed along a central optical axis into a non-imaging predetermined output in angle space comprising:
   a. a first surface adapted to distribute the pseudo-collimated radiant energy over a limited angular range relative to a central optical axis with pre-determined intensity distribution;
   b. a second surface adapted to distribute the energy generally orthogonally by sweeping the energy distributed from the first surface over a limited range relative to a second axis with pre-determined intensity distribution;
   c. a third surface which collimates the pseudo-collimated radiant energy.

90. An apparatus to convert pseudo-collimated radiant energy directed along a central optical axis into a non-imaging predetermined output in angle space comprising:
   a. a first surface adapted to distribute the pseudo-collimated radiant energy over a limited angular range relative to a central optical axis with pre-determined intensity distribution;
   b. a second surface adapted to distribute the energy generally orthogonally by sweeping the energy distributed from the first surface over a limited range relative to a second axis with pre-determined intensity distribution;
   c. wherein the first and second surfaces are implemented on independent components adapted to be assembled into a housing.

91. An apparatus to convert pseudo-collimated radiant energy directed along a central optical axis into a non-imaging predetermined output in angle space wherein the apparatus is incorporated into a lighting device that utilizes said predetermined output pattern which comprises minimum photometric values at test points in the pattern, comprising:
   a. a first surface adapted to distribute the pseudo-collimated radiant energy over a limited angular range relative to a central optical axis with pre-determined intensity distribution;
   b. a second surface adapted to distribute the energy generally orthogonally by sweeping the energy distributed from the first surface over a limited range relative to a second axis with pre-determined intensity distribution.

92. A method of creating a predetermined output pattern in angle space from a pseudo-collimated radiant energy source comprising:
   a. distributing energy from the pseudo-collimated energy source into regions of predetermined varying intensity into a beam of a limited angular range relative to a first axis;
   b. distributing energy from the beam of step (a) into a limited angular range relative to a second axis generally orthogonal to the first axis to create said predetermined output pattern retaining swept proportionality of the regions of predetermined varying intensity;
   c. wherein the output pattern is generally rectangular to produce a back up light pattern for an automotive vehicle.

93. A method of creating a predetermined output pattern in angle space from a pseudo-collimated radiant energy source comprising:
   a. distributing from a first surface with linear distribution elements aligned in parallel relative a first direction energy from the pseudo-collimated energy source into regions of predetermined varying intensity into a beam of a limited angular range relative to a first axis;
   b. distributing from a second surface energy from the beam of step (a) into a limited angular range relative to a second axis generally orthogonal to the first axis to create said predetermined output pattern retaining swept proportionality of the regions of predetermined varying intensity;
   c. wherein the first and second surfaces are physically separate and the output pattern is generally rectangular.

94. A method of creating a predetermined output pattern in angle space from a pseudo-collimated radiant energy source comprising:
   a. distributing from a first surface energy from the pseudo-collimated energy source into regions of predetermined varying intensity into a beam of a limited angular range relative to a first axis, wherein the distribution from the first surface is +/−25 to +/−90 degrees;
   b. distributing energy from the beam of step (a) into a limited angular range relative to a second axis generally orthogonal to the first axis to create said predetermined output pattern retaining swept proportionality of the regions of predetermined varying intensity;
   c. wherein the output pattern is generally rectangular.

* * * * *